(12) United States Patent
Yoshimi (10) Patent No.: US 8,676,418 B2
(45) Date of Patent: Mar. 18, 2014

(54) CONTROL SYSTEM AND CONTROL METHOD

(75) Inventor: Masashi Yoshimi, Toyota (JP)

(73) Assignee: Toyota Jidosha Kabushiki Kaisha, Toyota-shi (JE)

( * ) Notice: Subject to any disclaimer, the term of this patent is extended or adjusted under 35 U.S.C. 154(b) by 186 days.

(21) Appl. No.: 13/159,160

(22) Filed: Jun. 13, 2011

(65) Prior Publication Data

US 2011/0307134 A1   Dec. 15, 2011

(30) Foreign Application Priority Data

Jun. 15, 2010 (JP) ................................. 2010-135978

(51) Int. Cl.
*B60L 9/00* (2006.01)
(52) U.S. Cl.
USPC ................. 701/22; 701/1; 701/101; 701/112; 477/3; 477/5; 477/15
(58) Field of Classification Search
USPC .................. 701/22, 101, 1, 112; 447/3, 5, 15; 477/3, 5, 15
See application file for complete search history.

(56) References Cited

U.S. PATENT DOCUMENTS

| | | | | |
|---|---|---|---|---|
| 6,073,456 | A * | 6/2000 | Kawai et al. ..................... | 62/133 |
| 8,195,350 | B2 * | 6/2012 | Jinno .............................. | 701/22 |
| 8,229,616 | B2 * | 7/2012 | Aridome et al. ................ | 701/22 |
| 2006/0180362 | A1 * | 8/2006 | Yamaguchi et al. .......... | 180/65.2 |
| 2007/0199745 | A1 * | 8/2007 | Hayashi ........................ | 180/65.2 |
| 2007/0275819 | A1 * | 11/2007 | Hirata ............................... | 477/5 |
| 2007/0298928 | A1 * | 12/2007 | Yamanaka et al. .............. | 477/15 |
| 2008/0059035 | A1 * | 3/2008 | Siddiqui et al. ................. | 701/93 |
| 2008/0234915 | A1 * | 9/2008 | Nomasa et al. ............... | 701/102 |
| 2008/0303529 | A1 * | 12/2008 | Nakamura et al. ............ | 324/433 |
| 2008/0305923 | A1 * | 12/2008 | Tabata et al. ..................... | 477/3 |
| 2008/0318720 | A1 * | 12/2008 | Fukuda et al. .................... | 475/5 |
| 2009/0024262 | A1 * | 1/2009 | Amamiya ....................... | 701/22 |
| 2009/0055073 | A1 * | 2/2009 | Matsubara et al. ........... | 701/102 |
| 2009/0058326 | A1 * | 3/2009 | Oyobe et al. .................... | 318/53 |
| 2009/0143189 | A1 * | 6/2009 | Hasegawa et al. ................ | 477/5 |
| 2009/0236159 | A1 * | 9/2009 | Shibata et al. ........... | 180/65.235 |
| 2009/0312895 | A1 * | 12/2009 | Kim et al. ....................... | 701/22 |

(Continued)

FOREIGN PATENT DOCUMENTS

| | | |
|---|---|---|
| CN | 101522492 A | 9/2009 |
| JP | 2007-238022 A | 9/2007 |
| JP | 2008-137543 A | 6/2008 |
| JP | 2009-248822 A | 10/2009 |

*Primary Examiner* — John R Olszewski
*Assistant Examiner* — Truc M Do
(74) *Attorney, Agent, or Firm* — Gifford, Krass, Sprinkle, Anderson & Citkowski, P.C.

(57) ABSTRACT

A control for a hybrid vehicle includes; obtaining information that an EV switch that is operated when a travel of the vehicle in an EV mode in which priority is given to an EV travel in which the vehicle travels by a motive power only from a rotary electric machine is to be selected has been operated; starting a permission preparation control for causing a transition from a state in which a situation of the vehicle satisfies a predetermined reservation condition for reserving the EV mode to a state in which the situation of the vehicle satisfies a predetermined permission condition for permitting the EV mode if the situation of the vehicle does not satisfy the permission condition but satisfies the reservation condition when the EV switch has been operated; and enabling to control the travel of the vehicle in the EV mode if the predetermined permission condition is satisfied.

10 Claims, 4 Drawing Sheets

(56) References Cited

U.S. PATENT DOCUMENTS

2009/0322503 A1* 12/2009 Suzuki et al. ............. 340/438
2010/0044131 A1* 2/2010 Teraya .................... 180/65.265
2010/0087973 A1 4/2010 Kaita et al.
2010/0121510 A1 5/2010 Watanabe

* cited by examiner

CONTROL SYSTEM AND CONTROL METHOD

CROSS-REFERENCE TO RELATED APPLICATIONS

This application claims priority to Japanese Patent Application No. 2010-135978 filed on Jun. 15, 2010, which is incorporated herein by reference in its entirety including the specification, drawings and abstract.

BACKGROUND OF THE INVENTION

1. Field of the Invention

The invention relates to a control system and a control method for a vehicle. More particularly, the invention relates to a control system and a control method for a vehicle that is capable of traveling by motive power from at least one of an internal combustion engine and a rotary electric machine, and that is equipped with an EV switch that allows selection of a travel of the vehicle in an EV mode in which priority is given to an EV travel of the vehicle that is performed by the motive power only from the rotary electric machine.

2. Description of Related Art

Some of the hybrid vehicles capable of traveling by motive power from at least one of an internal combustion engine and a rotary electric machine are equipped with an EV switch. The EV switch has functions as follows. That is, during an HV travel in an HV mode in which the hybrid vehicle travels by motive power from the internal combustion engine and the rotary electric machine, the travel mode can automatically transition to an EV travel in some cases depending on conditions, but in some other cases, the EV travel is preferentially selected when the EV switch is depressed, on condition that a predetermined condition regarding the state of charge of an electricity storage device, the vehicle speed, the temperature of the rotary electric machine, etc. is satisfied. Thus, the provision of the EV switch makes it possible to give priority to the EV travel by the operation of depressing the EV switch besides the automatic transition from the HV travel to the EV travel that is performed depending on conditions.

For example, Japanese Patent Application Publication No. 2009-248822 (JP-A-2009-248822) points out, with regard to a amount-of-stored-electricity control apparatus of a hybrid vehicle capable of traveling in the EV mode in which only the rotary electric machine is used as a drive force generation source, that while the charging control of a high-voltage battery is performed so that the amount of stored electricity of the battery is between a lower-limit amount of stored electricity above which the battery is not overdischarged and an upper-limit amount of stored electricity below which the battery is not overcharged, the travel distance that can be requested in the EV mode is restricted by the upper-limit amount of stored electricity of the high-voltage battery. According to this publication, an EV mode preparation start switch and an EV mode travel start switch are provided, and when the EV mode preparation start switch has been switched on and a requested EV-mode cruising distance has been input, a target amount of stored electricity corresponding to the input requested cruising distance is calculated. Then, if the calculated target amount of stored electricity is greater than the upper-limit amount of stored electricity, the calculated target amount of stored electricity is used to perform the charging control. Then, if the EV travel start switch is turned on, the EV mode travel is performed after it is checked that the state of charge is greater than or equal to the lower-limit amount of stored electricity.

Besides, Japanese Patent Application Publication No. 2008-137543 (JP-A-2008-137543) describes a control method for a hybrid vehicle in which when the EV switch is turned on, an electric motor-driven travel of the vehicle is permitted and an indicator is lighted on if a motor-driven travel permission condition that the remaining SOC value of the battery be greater than or equal to a threshold SOC value and the coolant temperature Tw be greater than or equal to a threshold value T1 is satisfied. Furthermore, according to this publication, when the motor-driven travel permission condition is not satisfied, a warning sound or a warning voice is output, and the condition that has not been satisfied is shown on a display. When the remaining SOC value is greater than or equal to the threshold SOC value, but is such a value that it can be predicted that the SOC value will reach the threshold SOC value if the motor-driven travel continues, or when the vehicle speed is less than or equal to an upper-limit vehicle speed threshold value that the motor-driven travel is stopped, but is such a value that it can be predicted that the vehicle speed will reach the upper-limit vehicle speed threshold value if the motor-driven travel continues, a display indication regarding a predicted stop of travel is produced.

Besides, Japanese Patent Application Publication No. 2007-238022 (JP-A-2007-238022) describes a control method of controlling the system start of a hybrid vehicle in a situation where quietness is required, for example, during midnight, early morning, etc. In this control method, if an EV signal that is an electric motor-driven travel signal is turned on and an indicator is lighted on, or if the signal is stored into a flash memory and then a brake pedal is depressed and a power switch is pressed and therefore a starting control routine is executed, an HV ECU receives the EV signal that is transferred thereto with an IG signal and a start signal, so that the EV travel can be performed immediately following the system start of the vehicle.

During a travel during which quietness is required, such as during midnight, early morning, etc., as mentioned in Japanese Patent Application Publication No. 2007-238022 (JP-A-2007-238022), a hybrid vehicle capable of traveling by the motive power only from the rotary electric machine when the user operates the EV switch can fully demonstrate the feature thereof.

By the way, in order to enable the vehicle to travel by the motive power only from the rotary electric machine, it is necessary to satisfy conditions, including, for example, a condition that the amount of stored electricity of an electricity storage device be sufficient, a condition that the electric power of the electricity storage device not be being consumed in a large amount for another purpose, a condition that the internal combustion engine not be presently needed for the travel of the vehicle, etc. Thus, it is not always possible to perform a transition to the travel of the vehicle only by the rotary electric machine when the EV switch is operated by a user. As stated in Japanese Patent Application Publication No. 2008-137543 (JP-A-2008-137543), if when the EV switch is depressed it is determined that the EV mode travel is not feasible, a display indication, for example, a message "EV mode request has been cancelled." or the like, is produced by an appropriate display portion in a cabin of the vehicle. Thus, there can occur cases where although the user desires the EV mode travel, the desire cannot be accomplished, depending on the state of the vehicle.

SUMMARY OF THE INVENTION

The invention provides a control system and a control method for a vehicle which are able to improve the feasibility of a transition to an EV mode when an EV mode is requested via an EV switch.

A first aspect of the invention relates to a control system for a hybrid vehicle capable of traveling by motive power from at least one of an internal combustion engine and a rotary electric machine. This control system includes: an EV switch that is operated when a travel of the vehicle in an EV mode in which priority is given to an EV travel in which the vehicle travels by the motive power only from the rotary electric machine is to be selected; and a control apparatus that obtains information about state of operation of the EV switch, and that controls state of travel of the vehicle according to the information about the state of operation obtained, and the control apparatus includes: an obtainment portion that executes an operation information obtainment control of obtaining information that the EV switch has been operated; and a permission preparation portion that starts a permission preparation control for causing a transition from a state in which a situation of the vehicle satisfies a predetermined EV mode reservation condition to a state in which the situation of the vehicle satisfies a predetermined EV mode permission condition if the situation of the vehicle does not satisfy the EV mode permission condition but satisfies the EV mode reservation condition when the EV switch has been operated, and the control apparatus is configured to become able to perform a transition to an EV mode travel control when the EV mode permission condition is satisfied, and the travel of the vehicle in the EV mode is controlled in the EV mode travel control.

This control system is able to start the permission preparation control for causing the transition from the state in which a situation of the vehicle satisfies the predetermined EV mode reservation condition to the state in which the situation of the vehicle satisfies the predetermined EV mode permission condition if the situation of the vehicle does not satisfy the EV mode permission condition but satisfies the EV mode reservation condition when the EV switch has been operated, and is able to perform the transition to the EV mode travel control after the EV mode permission condition is satisfied due to the permission preparation control. Thus, since the permission preparation control for bringing about the state in which the EV mode permission condition is satisfied when the EV mode permission condition is not satisfied but the EV mode reservation condition is satisfied, the foregoing aspect of the invention will improve the feasibility of the transition to the EV mode travel and therefore will improve the convenience of users than a construction that always cancel the EV mode request when the EV mode preparation condition is not satisfied.

The foregoing control system may further include a display portion that changes a display manner according to a state of control of the control apparatus, and the display portion may present an unlit display as the display manner during a primary state, and may present a blinking display as a preparation state display manner during execution of the permission preparation control, and may present a continuous-on display as a standby state display manner when it is checked that the permission standby state is present.

In this control system, the display portion presents the unlit display as the display manner during the primary state, and presents the blinking display as the preparation state display manner during execution of the permission preparation control, and presents the continuous-on display as the standby state display manner when it is checked that the permission standby state is present.

In the foregoing control system, when the EV switch is operated, the permission preparation portion may determine whether or not the situation of the vehicle satisfies the EV mode permission condition, and may cause a transition to the EV mode travel control if the EV mode permission condition is satisfied, and may determine whether or not the situation of the vehicle satisfies the EV mode reservation condition, if the EV mode permission condition is not satisfied, and may cause a transition to a cancellation control of canceling an EV mode travel request made by operation of the EV switch, if the EV mode reservation condition is not satisfied, and may start the permission preparation control if the EV mode reservation condition is satisfied.

This control system determines whether or not the situation of the vehicle satisfies the EV mode permission condition, when the EV switch is operated. Then, if the EV mode permission condition is satisfied, the control system causes the transition to the EV mode travel control. If the EV mode permission condition is not satisfied, the control system determines whether or not the situation of the vehicle satisfies the EV mode reservation condition. If the EV mode reservation condition is not satisfied, the control system causes the transition to the cancellation control of canceling the EV mode travel request made by operation of the EV switch. If the EV mode reservation condition is satisfied, the control system starts the permission preparation control. Thus, this control system performs the permission preparation control when possible, instead of always canceling the EV mode request when the EV mode permission condition is not satisfied. Therefore, the control system is able to improve the feasibility of the transition to the EV mode travel, and therefore is able to improve the convenience of users.

In the foregoing control system, the standby control portion may cause a transition to a cancellation control of canceling an EV mode travel request made by operation of the EV switch and may avoid bringing about the permission standby state, if a pre-set time-out period elapses following a start of the permission preparation control by the permission preparation portion, and the standby control portion may check that the permission standby state is present, if the EV mode permission condition is satisfied before the time-out period elapses.

In this construction, if the pre-set time-out period elapses following the start of the permission preparation control by the permission preparation portion, the control system causes the transition to the cancel control of canceling the EV mode travel request made by operation of the EV switch and therefore avoids bringing about the permission standby state, and if the EV mode permission condition is satisfied before the time-out period elapses, the control system checks that the permission standby state is present. Therefore, when a user has a leeway of time before the time-out period elapses, it is possible to cause the transition to the EV mode travel. Thus, the convenience of the user improves.

In the foregoing control system, the standby control portion may automatically cause the transition to the EV mode travel control when the standby control portion has checked that the permission standby state is present.

In this control system, since the transition to the EV mode travel control is automatically caused if it is checked that the permission standby state is present, the feasibility of the transition to the EV mode travel can be improved without requiring the user to perform any special operation. Thus, the convenience of the user improves.

In the foregoing control system, the standby control portion may cause the transition to the EV mode travel control when the standby control portion has obtained the information that the EV switch has been operated again after checking that the permission standby state is present.

Since this control system causes the transition to the EV mode travel control when the information that the EV switch has been operated again is obtained after it is checked that the permission standby state is present, the user's intention can be re-checked, that is, it can be re-checked whether or not the user's request for the EV mode travel is still continuing. Therefore, the convenience of the user improves.

In the foregoing control system, the display portion may present, as the display manner during execution of the EV mode travel control, a continuous-on display in a display color that is different from both the display color of the preparation state display manner and the display color of the standby state display manner.

In this control system, since the display portion presents, as the display manner during execution of the EV mode travel control, the continuous-on display in a display color that is different from both the display color of the preparation state display manner and the display color of the standby state display manner, the user can visually check the status of process regarding the EV mode request, and therefore the convenience of the user improves.

In the foregoing control system, the permission preparation portion may impose, as the EV mode permission condition, a condition that a state of charge of an electricity storage device that supplies electric power for driving the rotary electric machine be greater than or equal to a predetermined EV permission threshold value, and may impose, as the EV mode reservation condition, a condition that the state of charge of the electricity storage device be less than the EV permission threshold value but greater than or equal to a predetermined EV reservable threshold value, and may perform, as the permission preparation control, a charging control of the electricity storage device with an increased target amount of stored electricity, if the EV mode reservation condition is satisfied.

Since this control system performs the charging control of the electricity storage device with an increased target value of the state of charge of the electricity storage device if the state of charge is less than the EV permission threshold value but greater than or equal to the predetermined EV reservable threshold value, the system is able to bring the state of charge of the electricity storage device to the EV permission threshold value so as to make the EV mode travel possible in an early period.

In the foregoing control system, the permission preparation portion may impose, as the EV mode reservation condition, one of a condition that a requested temperature regarding cabin air-conditioning be outside a predetermined temperature range, a condition that a vehicle speed be greater than or equal to a predetermined vehicle speed and a condition that a requested acceleration be greater than or equal to a predetermined acceleration, and the permission preparation portion may perform, as the permission preparation control, one of a control of setting a target temperature to a temperature that is closer to an actual temperature than the requested temperature is to the actual temperature, a control of controlling the vehicle speed with a reduced target vehicle speed and a control of controlling the acceleration with a reduced target acceleration, corresponding to the condition imposed as the EV mode reservation condition.

In this control system, when EV permission condition is not satisfied, the air-conditioning control is performed with a reduced requested target air-conditioned level, or the vehicle speed control is performed with a reduced target vehicle speed, or the acceleration control is performed with a reduced requested target acceleration. Therefore, the EV mode travel can be made possible.

A second aspect of the invention relates to a control method for a hybrid vehicle capable of traveling by motive power from at least one of an internal combustion engine and a rotary electric machine. This method includes: obtaining information that an EV switch that is operated when a travel of the vehicle in an EV mode in which priority is given to an EV travel in which the vehicle travels by the motive power only from the rotary electric machine is to be selected has been operated; avoiding entry into the EV mode and starting a permission preparation control for causing a transition from a state in which a situation of the vehicle satisfies a predetermined reservation condition for reserving the EV mode to a state in which the situation of the vehicle satisfies a predetermined permission condition for permitting the EV mode if the situation of the vehicle does not satisfy the permission condition but satisfies the reservation condition when the EV switch has been operated; and enabling to control the travel of the vehicle in the EV mode if the predetermined permission condition is satisfied.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described in detail with reference to the drawings. In the following description, a drive portion of a vehicle is constructed of one rotary electric machine. However, this is an illustrative example, and the drive portion may include a plurality of rotary electric machines. Besides, although an electric power supply circuit connected to the rotary electric machine includes an electricity storage device, a voltage converter and an inverter circuit in the following description, this is merely a presentation of component elements, and the electric power supply circuit may include component elements other than the foregoing component elements. For example, the electric power supply circuit may include a low-voltage inverter circuit, a system main relay, a DC/DC converter, etc.

In the following description, it is assumed that the EV switch is an operating button provided near a shift lever and that the display portion concerning an EV mode is an indicator mark provided in a portion of a combination meter assembly that is front of the driver's seat. However, these are illustrative examples, and may also be appropriately changed according to specifications of the vehicle or the like.

Hereinafter, like elements are denoted by the same reference characters in all the drawings, and will not be redundantly described. Besides, in the description below, a reference character used to denote a portion or the like will be later used again to denote a similar or the same portion or the like as needed.

Figure 1:
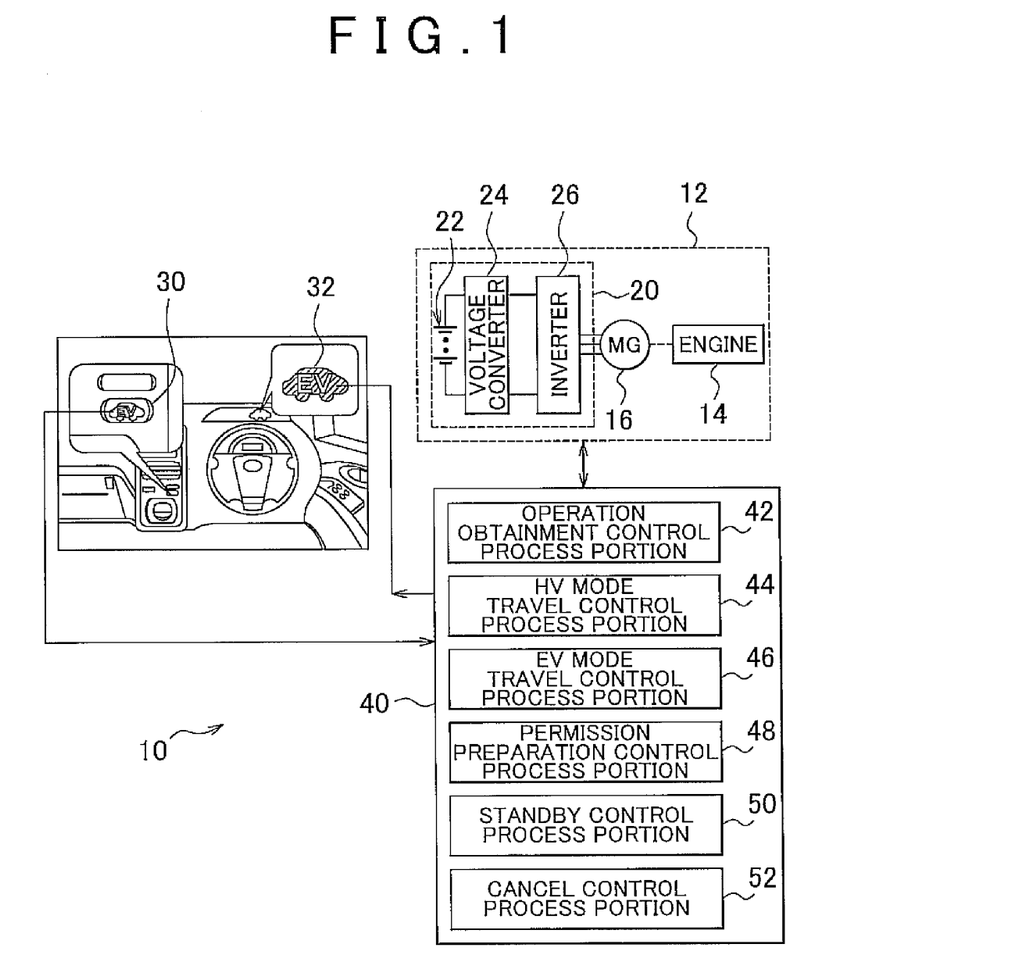
FIG. 1 is a diagram illustrating a construction of a vehicle control system in accordance with an embodiment of the invention.

FIG. 1 is a diagram illustrating a construction of a vehicle control system 10. This vehicle control system 10 is a system that generally controls operations of a hybrid vehicle, and, particularly in this embodiment, has a function of controlling an operation of the hybrid vehicle that is performed when an EV switch is operated. The vehicle control system 10 includes a drive portion 12, an EV switch 30, a display portion 32 that concerns an EV mode, and a control apparatus 40. The drive portion 12 includes an engine 14, a rotary electric machine 16, and an electric power supply circuit 20 that is connected to the rotary electric machine 16. Besides, the electric power supply circuit 20 includes an electricity storage device 22, a voltage converter 24, an inverter circuit 26.

The engine 14 is an internal combustion engine mounted in an engine compartment of the hybrid vehicle. The engine 14 and the rotary electric machine 16 together constitute a drive source of the vehicle. The engine 14 has a function of rotating tires and therefore causing the vehicle to travel by driving axle shafts of the vehicle, and also has a function of charging the electricity storage device 22 that is included in the electric power supply circuit 20 by using the rotary electric machine 16 as an electric generator.

The rotary electric machine 16 is a motor/generator (M/G) mounted in the vehicle, and is a three-phase synchronous type rotary electric machine which functions as an electric motor when supplied with electric power from the electric power supply circuit 20 that includes the inverter circuit 26, and which functions as a generator when driven by the engine 14 or when the hybrid vehicle is braking.

The electricity storage device 22 constituting the electric power supply circuit 20 is a chargeable/dischargeable high-voltage secondary battery. As the electricity storage device 22, it is possible to use, for example, a lithium-ion assembled battery, a nickel metal hydride assembled battery or a capacitor that has a terminal voltage of about 200 V, or the like. The assembled battery is a battery obtained by combining a plurality of batteries generally termed unit cells or electric cells which each have a terminal voltage of one to several voltages so that the assembled battery can produce a predetermined terminal voltage as mentioned above.

The voltage converter 24 is a circuit that is disposed between the electricity storage device 22 and the inverter circuit 26 and that has a voltage conversion function. The voltage converter 24 can be made up of a reactor, a switching element, etc. As for the voltage conversion function, the voltage converter 24 has a voltage step-up function of increasing the voltage of the electricity storage device 22 by utilizing the energy storing effect of the reactor and supplying the increased voltage to the inverter circuit 26 side, and a voltage step-down function of reducing the voltage of the electric power from the inverter circuit 26 side to the voltage for the electricity storage device 22 side and supplying the reduced voltage as charging power to the electricity storage device 22.

The inverter circuit 26 is a circuit connected to the rotary electric machine 16, and is made up of a plurality of switching elements, a reverse-connected diode, etc., and has a function of performing electric power conversion between alternating-current electric power and direct-current electric power. Specifically, when the rotary electric machine 16 is caused to function as a generator, the inverter circuit 26 performs an AC-to-DC conversion function of converting the alternating-current three-phase regenerative electric power supplied from the rotary electric machine 16 into direct-current electric power and supplying the direct-current electric power to the electricity storage device 22 side as a charging current. Besides, when the rotary electric machine 16 is caused to function as a motor, the inverter circuit 26 performs a DC-to-AC conversion function of converting the direct-current electric power supplied from the electricity storage device 22 side into alternating-current three-phase driving electric power and supplying the alternating-current driving electric power to the rotary electric machine 16.

FIG. 1 shows a view of an interior of the cabin of the hybrid vehicle taken from the driver's seat, in which the EV switch 30 and the display portion 32 concerning the EV mode are shown in enlarged views.

The EV switch 30 is an operating piece that is operated by a user in order to select a travel of the vehicle in the EV mode in which priority is given to an EV travel in which the vehicle travels by the drive force only from the rotary electric machine 16. That is, the hybrid vehicle can sometimes transition automatically to the EV travel depending on conditions, even during an HV travel in an HV mode in which the vehicle travels by using the motive power from the engine 14 and the rotary electric machine 16. Besides, when the EV switch 30 is depressed, the EV travel is preferentially selected on condition that a predetermined condition regarding the state of charge of the electric storage device 22, the vehicle speed, the temperature of the rotary electric machine 16, etc., is satisfied. Thus, the provision of the EV switch 30 makes it possible to give priority to the EV travel by performing the operation of depressing the EV switch 30, besides the transition from the HV travel to the EV travel which depends on conditions. Incidentally, what is referred to by the term "EV switch" herein broadly includes any operating piece that is operated by a user to request the travel of the vehicle in the EV mode in which the vehicle travels by the motive power only from the rotary electric machine 16, no matter what name it is given.

In the example shown in FIG. 1, the EV switch 30 is an operating button provided near a shift lever on the left side of the driver's seat. This operating button is a self-return push button that obtains the user's intention of operation when depressed and that returns to a home position when the depression ends. The state of operation of the EV switch 30 is transmitted to the control apparatus 40 through an appropriate signal line.

The display portion 32 concerning the EV mode is a display mark that has a function of changing its display manner according to the state of the control performed by the control apparatus 40 regarding the EV mode. In the example shown in FIG. 1, the display portion 32 is an indicator mark that is provided in a portion of a large-size display panel called combination meter assembly which is provided in front of the driver's seat. In this example, the indicator mark has the letters "EV" that are arranged in a car silhouette mark, and will be hereinafter termed the EV mark.

While FIG. 1 shows a lighted-on state of the display portion 32 in which the EV mark is displayed, the display portion 32 also has an unlit state (not shown) in which the EV mark is not displayed. Besides, the lighted-on state includes a first-color blinking state in which the EV mark blinks in red, a first-color continuous-on state in which the EV mark continues to be on in red, and a second-color continuous-on state in which the EV mark continues to be on in green. Thus, the display portion 32 has four manners of display. The display manners are selectively used corresponding to the state of control of the control apparatus 40, details of which will be described later.

The control apparatus 40, which functions to generally control the operations of various elements that constitute the vehicle control system 10, performs a function of controlling the operations of various elements when the EV switch 30 is operated. This control apparatus 40 is constructed of a computer that suitable to be mounted in the vehicle.

The control apparatus 40 includes: an operation obtainment control process portion 42 that obtains information that the EV switch 30 has been operated; an HV mode travel control process portion 44 that causes the vehicle to travel by using the engine 14 and the rotary electric machine 16; an EV mode travel control process portion 46 that causes the vehicle to travel by the motive power only from the rotary electric machine 16; a permission preparation control process portion 48 that starts a permission preparation control for changing from a state in which the situation of the vehicle satisfies an EV mode reservation condition (predetermined reservation condition) to a state in which the situation of the vehicle satisfies an EV mode permission condition (predetermined permission condition) if the situation of the vehicle satisfies the EV mode reservation condition but does not satisfy the EV mode permission condition when the EV switch 30 is operated; a standby control process portion 50 that checks that the vehicle is in a permission standby state in which a transition to the EV mode travel control is feasible, when the EV mode permission condition is satisfied due to the permission preparation control; and a cancel control process portion 52 that cancels an EV mode travel request made by operating the EV switch 30 when a predetermined condition is satisfied.

These functions can be realized by executing software processes and, more concretely, by executing portions of control regarding the EV switch in vehicle control programs. A portion of these functions may also be realized by a hardware device.

Figure 2:
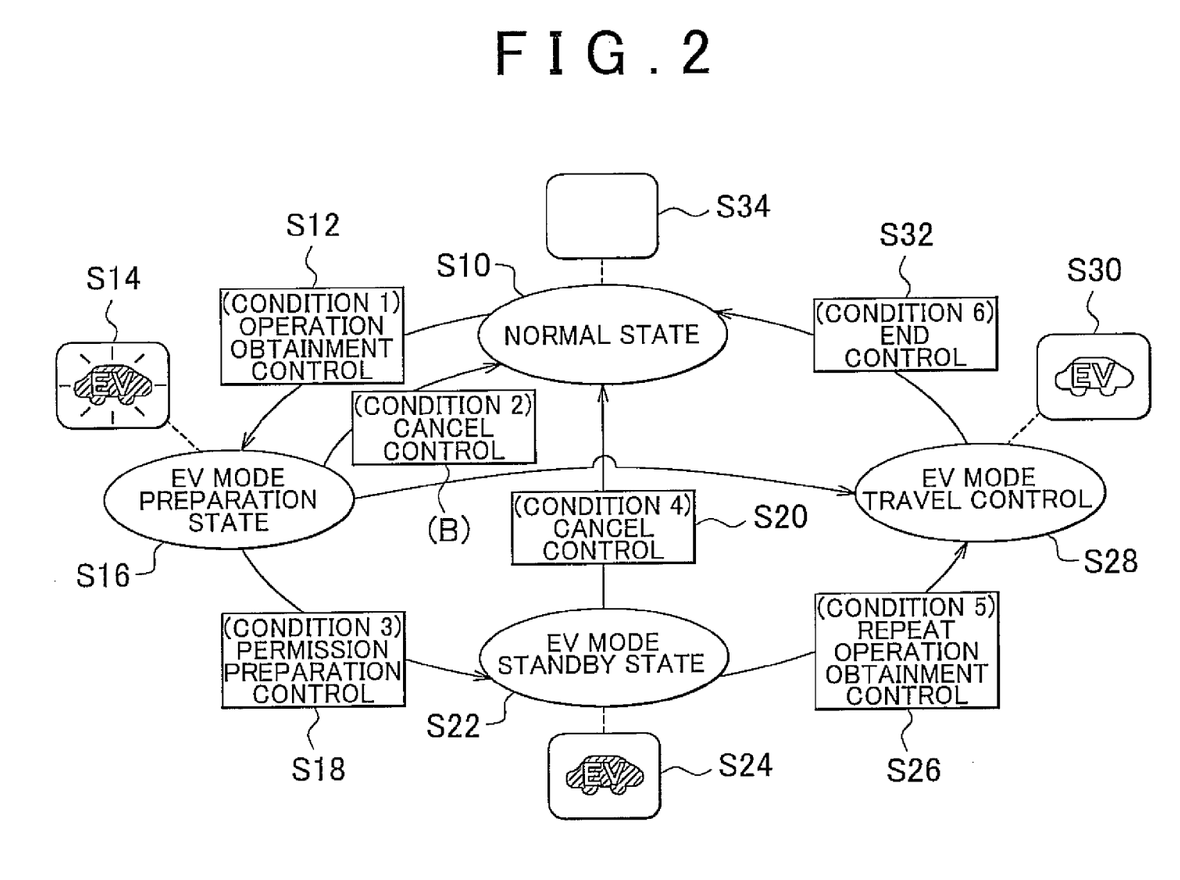
FIG. 2 is a diagram illustrating a manner of transition of state in the vehicle control system in accordance with the embodiment of the invention.
Figure 3:
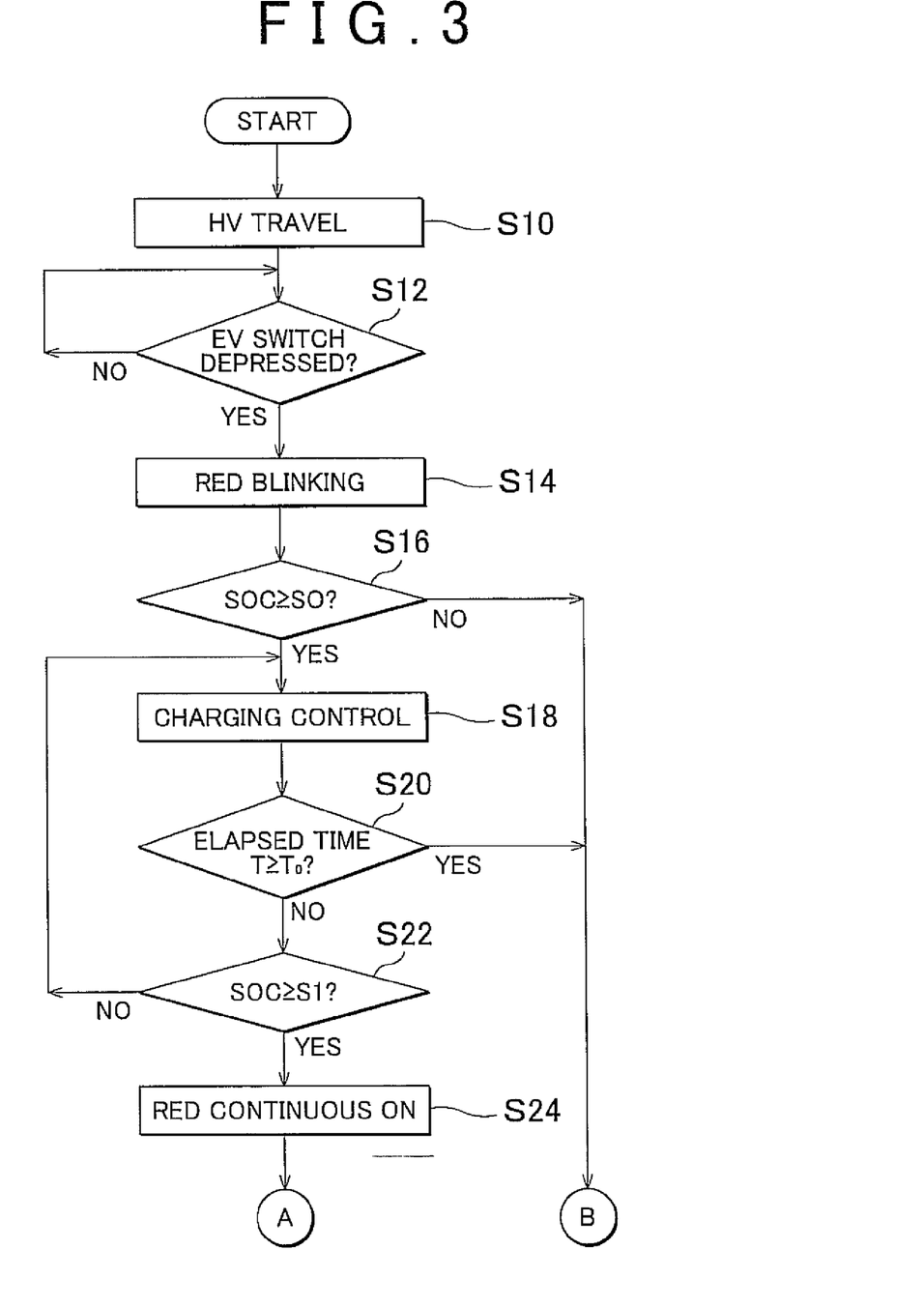
FIG. 3 is a first half of a flowchart illustrating a procedure of a vehicle control in the embodiment of the invention.
Figure 4:
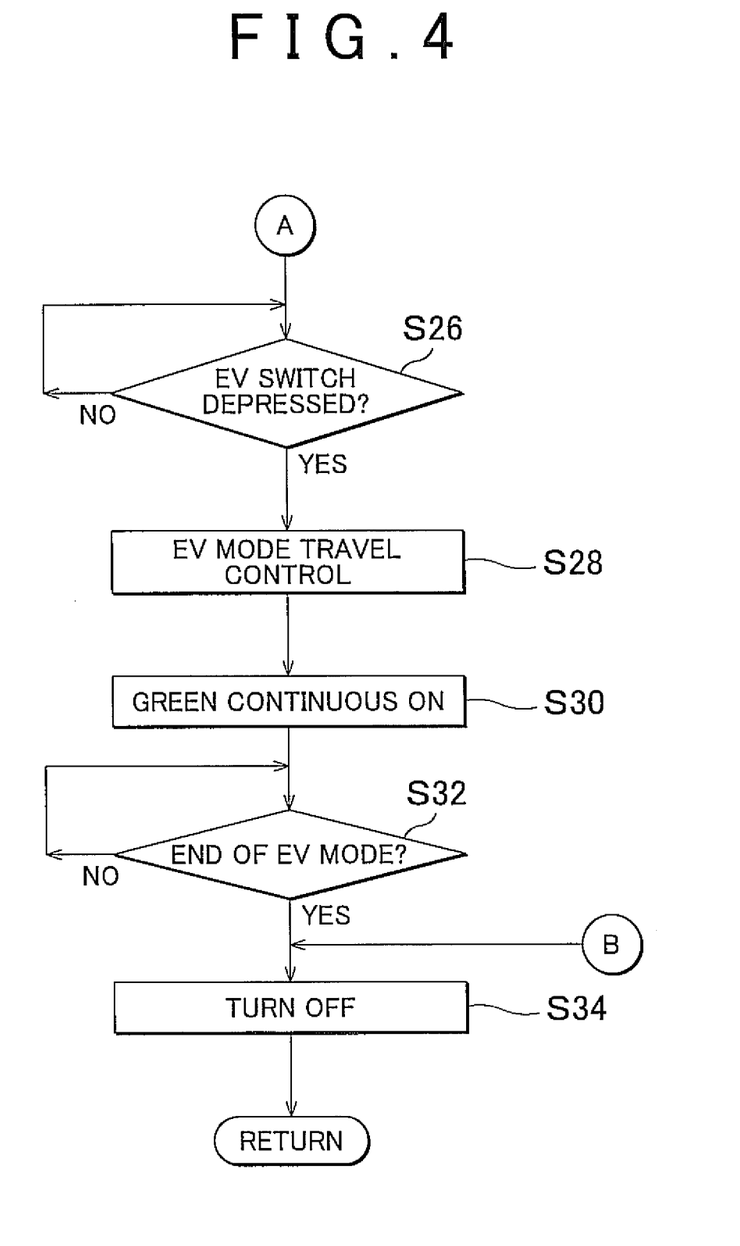
FIG. 4 is a second half of the flowchart continuing from FIG. 3.

Operation of the forgoing construction and, more particularly, various functions of the control apparatus 40 will be described in detail with reference to FIGS. 2 to 4. FIG. 2 is a diagram illustrating manners of transition of the state of the vehicle control system 10. FIGS. 3 and 4 are a flowchart illustrating a procedure of a vehicle control performed when a charging control regarding the SOC (state of charge) that represents the state of charge of the electricity storage device 22 is performed in the permission preparation control process. Incidentally, reference characters given to various states in FIG. 2 are reference characters assigned to processing steps in FIGS. 3 and 4 that correspond to the states shown in FIG. 2.

In FIG. 2, a normal state (primary state) (S10) is a state in which the state of the vehicle is not the state of the EV mode travel, that is, not the state of the EV mode travel in which the vehicle travels by the motive power from only the rotary electric machine 16. Concretely, this normal state is present when the EV switch 30 is not being operated by the user and the state of the vehicle does not satisfy a predetermined EV mode permission condition. Generally, the normal state is a state in which the HV mode travel control is being performed. The process of the HV mode travel control is executed by a function of the HV mode travel control process portion 44 of the control apparatus 40. The manner of display of the display portion 32 at this time is the unlit state. In FIG. 2, this state is a state denoted by S34 in which the EV mark is not displayed at all in the display portion 32.

In FIG. 2, the state (S12) in which the operation obtainment control is performed as condition 1 is a state in which the EV switch 30 has been operated by the user. Herein, condition 1 is a condition that the EV switch 30 be turned on. The process of obtaining information that the EV switch 30 has been turned on is executed by a function of the operation obtainment control process portion 42 of the control apparatus 40.

The EV preparation state (S14) is a state that is brought about by the control apparatus 40 when the EV switch 30 is operated. Concretely, this state is a state in which the permission preparation control process portion 48 of the control apparatus 40 is executing a process. At this time, the manner of display of the display portion 32 is the state of blinking in red. In FIG. 2, a state in which the EV mark is blinking in the display portion 32 is shown as S14.

During EV mode preparation state, several determination processes and the start of the permission preparation control are performed. The permission preparation control is a control for changing from the state in which the situation of the vehicle satisfies the predetermined EV mode reservation condition to the state in which the situation of the vehicle satisfies the predetermined EV mode permission condition when the situation of the vehicle does not satisfy the EV mode permission condition but satisfies the EV mode reservation condition.

During the EV mode preparation state, after the information that the EV switch 30 has been turned on is obtained, it is determined whether or not the situation of the vehicle satisfies the predetermined EV mode permission condition. The EV mode permission condition is a condition for making it possible for the vehicle to travel by the motive power only from the rotary electric machine 16. As the EV mode permission condition, a condition that the SOC of the electricity storage device 22 be greater than or equal to a predetermined EV permission threshold value S1 can be firstly cited. The threshold value S1 is set as a value around which there is capable of overdischarge if the electricity storage device 22 is discharged for the rotary electric machine 16 when the SOC is less than the threshold value S1. For example, the threshold value S1 may be set as S1=50%. This value is an illustrative example, and may naturally be a value other than this value as well.

Besides, another EV mode permission condition is that a requested cabin air-conditioned temperature is not outside a predetermined temperature range. The predetermined temperature range may be an ordinary temperature range of an air-conditioning control. For example, when the vehicle has been parked under the blazing sun or below the freezing point or the like, the temperature in the cabin of the vehicle becomes abnormally high or low, and the user requests rapid cooling or rapid heating, so that the supply of electric power to the air-conditioner apparatus rapidly increases and the load on the electricity storage device 22 increases. Since there are cases where the supply of electric power to the rotary electric machine 16 becomes insufficient as indicated above, the condition that the temperature requested of the cabin air-conditioning system not be outside a predetermined temperature range is added as an EV mode permission condition.

Besides, the condition that the vehicle speed be less than a predetermined vehicle speed, and the condition that the requested acceleration be less than a predetermined acceleration are also EV mode permission conditions. These conditions are given because there are cases where the user's request cannot be satisfied by the output of the rotary electric machine 16 alone and therefore the output of the engine 14 needs to be used as well.

Other EV mode permission conditions include, for example, a condition that the engine 14 not be being warmed up, and a condition that a pane frost removing device that is called defroster not be in operation. The former condition is adopted as an EV mode permission condition because the engine 14 cannot be stopped during the warm-up operation, and the latter condition is adopted as an EV mode permission condition because if the defroster is in operation, the load on the electricity storage device 22 is heavy.

Now back to the description of the EV mode preparation state, if the determination as to whether or not the EV mode permission condition is satisfied results in the determination that the EV mode permission condition is satisfied, the process of causing a transition to the EV mode travel control is performed. This is indicated in FIG. 2 by an arrow that extends from the EV mode preparation state denoted by S16 to the EV mode travel control denoted by S28.

If the determination as to whether or not the EV mode permission condition is satisfied results in the determination that the EV mode permission condition is not satisfied, it is then determined whether or not the EV mode reservation condition is satisfied. The EV mode reservation condition is a condition such that the EV mode permission condition can be satisfied if the vehicle is given a leeway of time to perform a predetermined permission preparation control.

That is, the EV mode reservation condition indicates a state of the vehicle that the present state of the vehicle does not satisfy the EV mode permission condition but, if given a little leeway of time, the state of the vehicle can be adjusted in the given time so as to satisfy the EV mode permission condition. This leeway of time will be termed the time-out period. The time-out period is a waiting time that the user can tolerate from when the user presses the EV switch 30 to when the vehicle actually transitions to the EV mode travel.

For example, when during the traveling of the vehicle, the user desires to select the EV mode travel as the vehicle is about to enter a quiet residential area, if the user depresses the EV switch 30 with a leeway in time before the vehicle enters the residential area, it becomes certainly possible to perform the permission preparation control during the leeway time. The time-out period can be set by taking these circumstances into account, and the EV mode reservation condition can be set so that the EV mode permission condition will be satisfied within the time-out period.

For each of the foregoing EV mode permission conditions, an EV mode reservation condition is set. For the EV mode permission condition that the SOC of the electricity storage device 22 be greater than or equal to the EV permission threshold value S1, it is possible to set an EV mode reservation condition that the SOC of the electricity storage device 22 be greater than or equal to an EV reservable threshold value S0 that is less than the EV permission threshold value S1. The size of the difference between the threshold values S0 and S1 can be determined by the time-out period and the electricity generation control capability of the rotary electric machine 16 by the engine 14.

For example, in the foregoing conditions, the SOC S1 may be set at 50%, and the time-out period may be set at 5 minutes, and then the SOC S0 may be set at 45%. That is, if the SOC can be increased by 5% in 5 minutes, it becomes possible in 5 minutes to change the travel of the vehicle into the EV mode travel although it is presently impossible to change into the EV mode travel. Incidentally, the foregoing values of the time-out period and the SOC S0 are mere illustrative examples.

For the EV mode permission condition that the requested cabin air-conditioned temperature not be outside a predetermined temperature range, or the EV mode permission condition that the vehicle speed be less than a predetermined vehicle speed, or the EV mode permission condition that the requested acceleration be less than a predetermined acceleration, it is possible to set as the EV mode reservation condition a condition that the requested cabin air-conditioned temperature be outside the predetermined temperature range but the difference of the requested cabin air-conditioned temperature from the adjacent one of the upper and lower-limit values of the range be less than a predetermined amount, a condition that the vehicle speed be greater than or equal to the predetermined vehicle speed but the excess of the vehicle speed over the predetermined vehicle speed be less than a predetermined amount, or a condition that the requested acceleration be greater than or equal to the predetermined acceleration but the excess of the requested acceleration from the predetermined acceleration be less than a predetermined amount. The foregoing predetermined amounts can be set in relation with the time-out duration.

Now back to the description of the EV mode preparation state, if the determination as to whether or not the EV mode reservation condition is satisfied results in the determination that the EV mode reservation condition is not satisfied, a transition to a cancellation control of canceling the EV mode travel request made through operation of the EV switch 30 is brought about. This transition state is shown in FIG. 2 by a cancellation control for Condition 2 in a change from the EV mode preparation state denoted by S16 toward a normal state denoted by S10. The process of the cancellation control is executed by the function of the cancel control process portion 52 of the control apparatus 40. It is to be noted herein that Condition 2 is the condition that the EV mode reservation condition not be satisfied.

If the determination as to whether or not the EV mode reservation condition is satisfied results in the determination that the EV mode reservation condition is satisfied, the permission preparation control is started. FIG. 2 shows a transition from the EV mode preparation state denoted by S16 to a Condition-3 permission preparation control state denoted by S18. Condition 3 is the condition that the EV mode reservation condition be satisfied.

The permission preparation control is a control for changing from the state in which the situation of the vehicle satisfies the EV mode reservation condition to the state in which the situation of the vehicle satisfies the EV mode permission condition. In the permission preparation control, when the EV mode permission condition is the condition that the SOC of the electricity storage device 22 be greater than or equal to the EV permission threshold value S1 and the EV mode reservation condition is the condition that the SOC of the electricity storage device 22 be greater than or equal to the EV reservable threshold value S0, the charging control of the drive portion 12 is executed so that the SOC of the electricity storage device 22 becomes greater than or equal to the EV permission threshold value S1.

Concretely, the charging control is performed by setting a target state of charge that is increased from the target state of charge used in the presently executed charging control. That is, the charging control is performed with a target amount of stored electricity that is increased from the target amount used in the presently executed charging control. For example, in the case where an SOC of 60% is set as an upper-limit SOC for the target state of charge used in the presently executed charging control, the upper-limit SOC is increased to an SOC of 70%. Due to this, the charging of the electricity storage device 22 is accelerated from the present charging, so that the EV mode permission condition can be met sooner. The amount of increase of the target state of charge can be set by taking the time-out period or the like into account. The increase of the target state of charge is cancelled and an ordinary target of charge is resumed, when the EV mode permission condition is met. Incidentally, the foregoing values of the target state of charge are also illustrative examples.

In the case where the EV mode permission condition is one of the condition that the requested cabin air-conditioned temperature not be outside the predetermined temperature range, the condition that the vehicle speed be less than the predetermined vehicle speed, and the condition that the requested acceleration be less than the predetermined acceleration, and where the EV mode reservation condition is a corresponding one of the condition that the requested cabin air-conditioned temperature be outside the predetermined temperature range but the difference of the requested cabin air-conditioned temperature from the adjacent one of the upper and lower-limit values of the range be less than the predetermined amount in temperature, the condition that the vehicle speed be greater than or equal to the predetermined vehicle speed but the excess of the vehicle speed over the predetermined vehicle speed be less than the predetermined amount in vehicle speed, and the condition that the requested acceleration be greater than or equal to the predetermined acceleration but the excess of the requested acceleration from the predetermined acceleration be less than the predetermined amount in acceleration, the permission preparation control performed in conjunction with any one of the foregoing combinations of the EV mode permission condition and the EV mode reservation condition is a control for changing from the state in which the EV mode reservation condition is satisfied to the state in which the EV mode permission condition is satisfied.

Concretely, the permission preparation control performed in conjunction with the foregoing combinations of the conditions is to perform the air-conditioning control by reducing the requested target air-conditioning (i.e., set the target temperature at a temperature that is closer to the present actual temperature than the requested temperature is to the present actual temperature), perform the vehicle speed control by reducing the target vehicle speed, or perform the acceleration control by reducing the requested target acceleration, according to the EV mode reservation condition. For these combinations of the conditions, the EV mode permission condition can be promptly met by performing a temporary correction of the present control target value, for example, an appropriate increase thereof, or the like.

In FIG. 2, an EV mode standby state denoted by S22 is a state that follows the execution of the permission preparation control in S18. Concretely, the EV mode standby state in S22 is a state in which the standby control process portion 50 of the control apparatus 40 is executing the process. At this time, the manner of display of the display portion 32 is the red-color continuous-on state. In FIG. 2, a state in which the EV mark is continuously on in the display portion 32 is shown in S24.

During the EV mode standby state, a standby control process is performed as follows. That is, when the EV mode permission condition is satisfied due to the permission preparation control, it is checked that the present state is a permission standby state in which a transition to the EV mode travel control is feasible from then on.

Concretely, if, following the start of the permission preparation control in the EV mode preparation state in S16, the pre-set time-out period elapses after the permission preparation control is executed in the permission preparation control state in S18, a process of causing a transition to the cancellation control of canceling the EV mode travel request made by operation of the EV switch 30 is performed. FIG. 2 shows a cancellation control for Condition 4 in S20 in a change from the standby state in S22 toward the normal state in S10. The process of the cancellation control is executed by the function of the cancel control process portion 52 of the control apparatus 40 as described above. Incidentally, Condition 4 is the condition that the time-out period have elapsed.

It is to be noted that when the EV mode permission condition is satisfied before the time-out period elapses, it is checked that the present state is the permission standby state. This state is the EV mode standby state in S22, during which the EV mark is continuously on in red in the display 32 in S24.

When the EV mode standby state is entered, the EV mark in the display portion 32 changes from the blinking state to the continuous-on state, which is intended to inform the user that the transition to the EV mode travel control can be performed from then on, and to prompt the user to depress the EV switch 30 again if the user desires the transition to the EV mode travel control. It is preferable that this be written in the user's manual of the vehicle beforehand so as to be notified to the user.

In FIG. 2, a repeat operation obtainment control under Condition 5 in S26 represents a process of obtaining the information that the user has operated the EV switch 30 again. Condition 5 is the condition that the EV switch 30 have been turned on. If Condition 5 is satisfied, the control transitions to an EV mode travel control in S28, so that the vehicle travels by the motive power only from the rotary electric machine 16. This process is executed by the function of the EV mode travel control process portion 46 of the control apparatus 40.

At this time, the manner of display of the display portion 32 is a green-color continuous-on state. In FIG. 2, a state in which the EV mark is continuously on in the display portion 32 is shown in S30. Since the color of light of the EV mark is red in S14 and S24, and green in S30, the two colors are shown differently by providing hatch lines in the EV mark in S14 and S24 while the EV mark in S30 is not provided with hatch lines.

When the state of the vehicle satisfies the predetermined condition, the EV mode travel control transitions to the HV mode travel control, and thus ends. This is shown in FIG. 2 by an end control under Condition 6 in S32 in a change from the EV mode travel control in S28 toward the normal state in S10. Condition 6 is a condition that the state of the vehicle come not to satisfy the EV mode permission condition. For example, Condition 6 is a condition that the SOC have become less than S1, or the like.

Incidentally, although the foregoing description has been made on the assumption that a repeat operation of the EV switch 30 by the user is needed in order to cause the transition from the EV mode standby state in S22 to the EV mode travel control in S28, the transition to the EV mode travel control may also be automatically performed. Specifically, after the EV mark is changed to the red-color continuous-on state in response to the satisfaction of the EV mode permission condition due to the permission preparation control, the control may immediately transition to the EV mode travel control in S28. In this case, the change of the display portion 32 to green in S30 may be omitted. Of course, the display portion 32 may also be continuously on in red in S24, and continuously on in green in S28.

FIGS. 3 and 4 are a flowchart showing a procedure that is performed when all the EV mode permission conditions except the condition regarding the SOC are satisfied and only the SOC poses a problem in the operation shown in FIG. 2. Incidentally, the number of steps in the procedure is great, and therefore the flowchart is divided into two parts shown in FIG. 3 and FIG. 4. The steps of the procedure correspond to individual steps of the processing procedure of a control portion of the vehicle control program which concerns the EV switch. When the vehicle control program is started and the vehicle begins to travel, the HV mode travel control is usually performed (S10). This corresponds to the normal state shown in FIG. 2. At this time, the manner of display of the display portion 32 is the EV mark unlit state.

Then, at appropriate sampling intervals, it is determined whether or not the EV switch 30 has been depressed (S12). This state corresponds to the operation obtainment control state under Condition 1 in FIG. 2. If it is determined that the EV switch 30 has been depressed, the display manner of the display portion 32 is changed to the red EV mark blinking state (S14).

Then, it is determined whether or not the SOC is smaller than the EV permission threshold value S1 and is greater than or equal to the EV reservable threshold value S0 (S16). The EV permission threshold value S1 of SOC is the EV mode permission condition, and the EV reservable threshold value S0 of SOC is the EV mode reservation condition. In the example described above with reference to FIG. 2, S1=50% and S0=45%. If the determination in S16 is negative, the process proceeds to S34 in FIG. 4. This is the cancel control state under Condition 2 in FIG. 2, and S34 corresponds to the normal state.

If the determination in S16 is affirmative, the charging control as a permission preparation control is started. Concretely, the upper-limit SOC value as the target state of charge is temporarily increased, and the charging control is started. This corresponds to the EV mode preparation state in FIG. 2. Then, the charging control is executed (S18). This state corresponds to the permission preparation control state under Condition 3 in FIG. 2.

Then, it is determined whether or not the elapsed time T following the start of the permission preparation control is greater than or equal to a predetermined time-out period $T_0$ (S20). If the determination is affirmative, the process proceeds to S34 in FIG. 4. This is the cancel control state under Condition 4 in FIG. 2, and S34 corresponds to the normal state.

While the determination in S20 is negative, it is subsequently determined whether or not the SOC is greater than or equal to S1 (S22). Then, if the determination in S22 is affirmative, which means that the EV mode permission condition is satisfied before the time-out period T0 elapses, then the display manner of the display portion 32 is changed to the red EV mark continuous-on state (S24). This state corresponds to the EV mode standby state shown in FIG. 2.

Then, it is determined whether or not the user has depressed the EV switch 30 again (S26). This state corresponds to the state of the repeat operation obtainment control under Condition 5 in FIG. 2. Incidentally, the term "again" or "repeat" concerns whether or not the EV switch 30 has been depressed once again following S24 after the EV switch 30 is depressed in S12, and does not concern whether or not the EV switch 30 has been depressed twice in S26.

If the determination in S26 is affirmative, the process proceeds to the EV mode travel control (S28). Then, the manner of display of the display portion 32 changes to the green EV mark continuous-on state (S30). This state corresponds to the EV mode travel control state in FIG. 2.

After that, it is determined whether or not the EV mode is to end (S32). This state corresponds to the state of the end control under Condition 6 in FIG. 2. If this determination is affirmative, the display manner of the display portion 32 switches to the unlit state (S34), and the process returns to the HV mode travel control state in S10.

Thus, in this embodiment, the EV mode preparation state and the EV mode standby state are provided, and when the EV mode permission condition is not presently satisfied, the permission preparation control is performed so that the EV mode permission condition will be satisfied within the time-out period. Therefore, the feasibility of the transition to the EV mode travel can be improved, and the convenience of the user can be improved.

The vehicle control system in accordance with the invention can be used for the control of a hybrid vehicle that has an EV switch.

What is claimed is:

1. A control system for a hybrid vehicle capable of traveling by motive power from at least one of an internal combustion engine and a rotary electric machine, comprising:
   an EV switch that is operated when a travel of the vehicle in an EV mode is to be selected, in the EV mode priority is given to an EV travel in which the vehicle travels by the motive power only from the rotary electric machine; and
   a control apparatus that obtains information about a state of operation of the EV switch, and the control apparatus controls a state of travel of the vehicle according to the information about the state of operation obtained,
   wherein the control apparatus includes:
   an obtainment portion that executes an operation information obtainment control of obtaining information that the EV switch has been operated;
   a permission preparation portion that starts a permission preparation control for causing a transition from a state in which a situation of the vehicle satisfies a predetermined EV mode reservation condition to a state in which the situation of the vehicle satisfies a predetermined EV mode permission condition if the situation of the vehicle does not satisfy the EV mode permission condition but satisfies the EV mode reservation condition when the EV switch has been operated; and
   a standby control portion checks that a permission standby state in which a transition to an EV mode travel control is feasible is present, after the EV mode condition is satisfied due to the permission preparation control,
   wherein the control apparatus is configured to be able to perform a transition to the EV mode travel control when the EV mode permission condition is satisfied, and
   wherein the travel of the vehicle in the EV mode is controlled in the EV mode travel control.

2. The control system according to claim 1, further comprising
   a display portion that changes a display manner according to a state of control of the control apparatus,
   wherein the display portion presents an unlit display as the display manner during a primary state, and presents a blinking display as a preparation state display manner during execution of the permission preparation control, and presents a continuous-on display as a standby state display manner when it is checked that the permission standby state is present.

3. The control system according to claim 1, wherein
   when the EV switch is operated, the permission preparation portion determines whether or not the situation of the vehicle satisfies the EV mode permission condition, and causes a transition to the EV mode travel control if the EV mode permission condition is satisfied, and determines whether or not the situation of the vehicle satisfies the EV mode reservation condition, if the EV mode permission condition is not satisfied, and causes a transition to a cancellation control of canceling an EV mode travel request made by operation of the EV switch if the EV mode reservation condition is not satisfied, and starts the permission preparation control if the EV mode reservation condition is satisfied.

4. The control system according to claim 1, wherein
   the standby control portion causes a transition to a cancellation control of canceling an EV mode travel request made by operation of the EV switch and avoids bringing about the permission standby state, if a pre-set time-out period elapses following a start of the permission preparation control by the permission preparation portion, and the standby control portion checks that the permission standby state is present, if the EV mode permission condition is satisfied before the time-out period elapses.

5. The control system according to claim 4, wherein the standby control portion automatically causes the transition to the EV mode travel control when the standby control portion has checked that the permission standby state is present.

6. The control system according to claim 4, wherein the standby control portion causes the transition to the EV mode travel control when the standby control portion has obtained the information that the EV switch has been operated again after checking that the permission standby state is present.

7. The control system according to claim 2, wherein the display portion presents, as the display manner during execution of the EV mode travel control, a continuous-on display in a display color that is different from both the display color of the preparation state display manner and the display color of the standby state display manner.

8. The control system according to claim 1, wherein the permission preparation portion imposes, as the EV mode permission condition, a condition that a state of charge of an electricity storage device that supplies electric power for driving the rotary electric machine be greater than or equal to a predetermined EV permission threshold value, and imposes, as the EV mode reservation condition, a condition that the state of charge of the electricity storage device be less than the EV permission threshold value but greater than or equal to a predetermined EV reservable threshold value, and performs, as the permission preparation control, a charging control of the electricity storage device with an increased target amount of stored electricity, if the EV mode reservation condition is satisfied.

9. The control system according to claim 1, wherein the permission preparation portion imposes, as the EV mode reservation condition, one of a condition that a requested temperature regarding cabin air-conditioning be outside a predetermined temperature range, a condition that a vehicle speed be greater than or equal to a predetermined vehicle speed and a condition that a requested acceleration be greater than or equal to a predetermined acceleration, and the permission preparation portion performs, as the permission preparation control, one of a control of setting a target temperature to a temperature that is closer to an actual temperature than the requested temperature, a control of controlling the vehicle speed with a reduced target vehicle speed and a control of controlling the acceleration with a reduced target acceleration, corresponding to the condition imposed as the EV mode reservation condition.

10. A control method for a hybrid vehicle capable of traveling by motive power from at least one of an internal combustion engine and a rotary electric machine, comprising:

obtaining information that an EV switch that is operated when a travel of the vehicle in an EV mode is to be selected, in the EV mode priority is given to an EV travel in which the vehicle travels by the motive power only from the rotary electric machine;

avoiding entry into the EV mode and starting a permission preparation control for causing a transition from a state in which a situation of the vehicle satisfies a predetermined reservation condition for reserving the EV mode to a state in which the situation of the vehicle satisfies a predetermined permission condition for permitting the EV mode if the situation of the vehicle does not satisfy the permission condition but satisfies the reservation condition when the EV switch has been operated;

checking that a permission standby state in which the a transition to an EV mode travel control is feasible is present, after the EV mode condition is satisfied due to the permission preparation control; and enabling to control the travel of the vehicle in the EV mode if the predetermined permission condition is satisfied.

* * * * *